Patented Jan. 16, 1923.

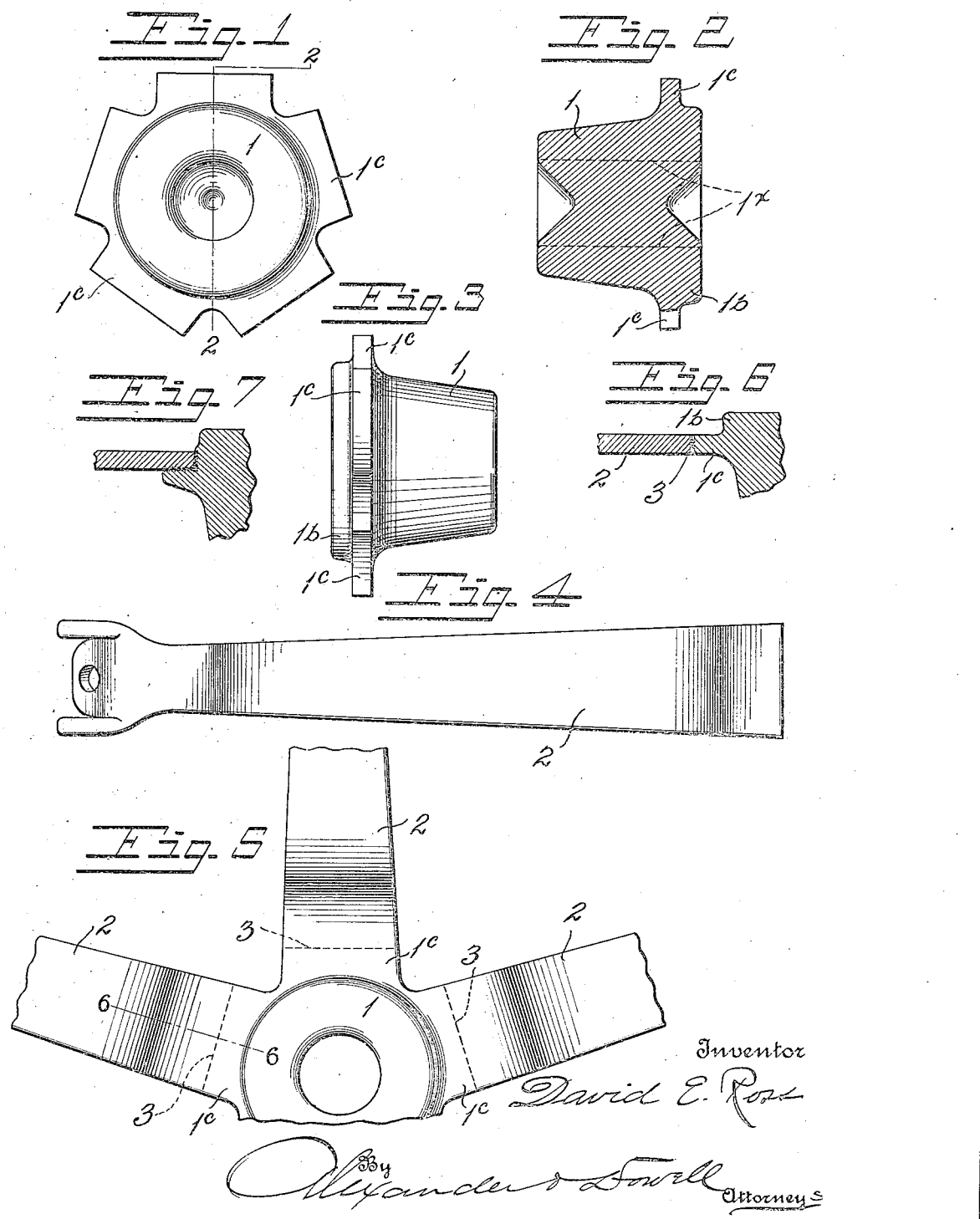

1,442,539

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

STEERING-WHEEL HUB AND SPOKE.

Application filed February 9, 1920. Serial No. 357,322.

*To all whom it may concern:*

Be it known that I, DAVID E. ROSS, a citizen of the United States, residing at La Fayette, in the county of Tippecanoe and State of Indiana, have invented certain new and useful Improvements in Steering-Wheel Hubs and Spokes; and I hereby declare that the following is a full, clear, and exact description thereof, reference being had to the accompanying drawings, which form part of this specification.

This invention relates to pulleys and wheels, and particularly to steering wheels for automobiles; and its object is to produce a forged hub section and forged or pressed spoke sections united to the hub section by electric welding; which will be cheaper to manufacture than the present known malleable hubs and spokes; and which will be of equal or greater strength than the best heretofore known malleable hubs and spokes of like size and weight.

In the present invention I forge the hub section out of pressed steel, or other suitable metal, and similarly make the spoke sections, and then unite the spokes to the spoke bases on the hub section by electrically welded joints.

To impart a clear understanding of the invention to those familiar with the art I will first explain some practical embodiments thereof, as illustrated in the accompanying drawings; and thereafter summarize in the claims the essentials of the invention and the novel features of construction and combinations of parts for which protection is desired.

In the drawings:

Fig. 1 is an end view of the forged hub section.

Fig. 2 is a sectional view of this hub section on the line 2—2 Fig. 1.

Fig. 3 is a side view of said hub section.

Fig. 4 is a view of one of the spoke sections detached.

Fig. 5 is a detail view of part of a complete wheel showing the spoke sections attached to the hub section by an abutting welded joint.

Fig. 6 is a detail section on the line 6—6, Fig. 5.

Fig. 7 is a detail section, like Fig. 6, but showing a lapped welded joint.

The invention includes a hub section 1, and a series of radially disposed spoke sections 2. The hub sections is forged of one piece of steel, or other suitable metal, and is formed with a hub portion 1, which can be externally finished in forging to the desired exterior shape and size of the hub of the complete wheel.

The hub section 1 may be axially bored, as indicated by dotted lines $1^x$ in Fig. 2, to fit the steering rod or shaft on which the wheel is mounted in the well known manner. Said hub section is also provided, preferably adjacent one end thereof, with a circumferential enlarged or thickened portion $1^b$, from which extend stub-spokes or spoke-bases $1^c$, which are forged integral with and project radially from the hub section. The spoke bases $1^c$ should project sufficiently from the hub section to enable the spoke sections 2 to be thereafter readily connected therewith by welding, and sufficiently to enable the outer extremities of the spoke-bases to be conformed in contour to the contour of the inner ends of the spoke-sections to be connected therewith. In other words the cross sectional area and form of the outer end of each spoke-base $1^c$ should conform in cross sectional area and form with the inner end of the related spoke section 2.

The spoke sections 2 may be forged or pressed out of steel or other suitable metal, and are made of such length that when united by welding to the spoke-bases $1^c$ they will with the hub member form a wheel-center adapted to be connected with a rim of the desired dimensions; the internal diameter of such rim determining the length of the spoke members 2, whose length of course will vary with the internal diameter of the wheel rim, the external diameter of the hub section, length of the spoke bases, the particular method of welding used, and also the particular means or method employed for connecting the outer ends of the spokes to the rim.

The ends of the spoke sections and of the related spoke-bases should be so formed that they will have a neat appearance when united. The spokes are preferably united to the spoke bases by welding them by electricity, as indicated at 3, in Figs. 5 and 6, or at $3^x$ in Fig. 7, and when so welded the spoke sections and hub section becomes practically homogeneous or unitary and together form a very strong substantial wheel center.

The rim (not shown) may be of any suitable kind—according to the use for which the complete wheel or pulley is intended or desired. The particular rim used, and the means for uniting the outer ends of the spokes 2 to such rim, form no part of the present invention and therefore are not shown nor described herein.

The spokes may be welded to the spoke bases by any suitable means and by any suitable method. I prefer to weld them by electricity. As indicated in Figs. 5 and 6 the ends of the spokes could be abutted against the ends of the spoke-bases and welded thereto; and as indicated in Fig. 7, the ends of the spokes may overlap the spoke-bases and be welded thereto. Such electric welding may be performed in accordance with any preferred method, and by any suitable apparatus.

What I claim is:

1. For a wheel, a forged hub section exteriorly shaped to correspond to the form of hub desired and provided with a circumferential enlarged portion near one end thereof and a plurality of spoke bases projecting radially from said enlargement, said enlarged portion forming a web between and uniting the spoke bases.

2. For a wheel, a forged hub section exteriorly shaped to correspond to the form of hub desired and provided with a circumferential enlarged portion near one end thereof and a plurality of spoke bases projecting radially from said enlargement, said enlarged portion forming a web between and uniting the spoke bases; with spoke sections electrically welded to the inner ends of the spoke bases on the hub.

3. For a wheel, a forged hub section exteriorly shaped to correspond to the form of hub desired and provided with a circumferential enlarged portion near one end thereof and a plurality of spoke bases projecting radially from said enlargement, said enlarged portion forming a web between and uniting the spoke bases; with spoke sections electrically butt welded to the inner ends of the spoke bases on the hub, the abutting ends of the spoke bases being alike in contour.

4. In a wheel, a hub section forged out of suitable metal and provided with a plurality of spoke bases projecting radially therefrom, the outer ends of the spoke-bases being shaped to conform to the inner ends of the spoke sections and dressed to fit thereagainst; with spoke sections having their inner ends shaped to conform to the outer ends of the spoke bases and dressed to fit thereagainst and united thereto by electric welds, substantially as described.

5. In a wheel a hub section forged out of steel or suitable metal and provided with a circumferential enlargement and a plurality of circumferentially disposed spoke bases projecting radially therefrom and formed integral therewith, the outer ends of the spoke bases being formed to fit the inner ends of the spoke sections and dressed to abut thereagainst; with spoke sections having their inner ends shaped to conform to the outer ends of the spoke bases and dressed to abut thereagainst and abutted thereagainst and united thereto by electric butt welds, substantially as described.

6. In a wheel, a hub section forged out of steel or suitable metal to conform exteriorly to the desired finished hub and provided with a circumferential enlargement near one end and a plurality of circumferentially disposed spoke bases projecting radially from such enlargement and formed integral therewith, said enlargement forming a web between and uniting the spoke bases, the outer ends of the spoke bases being shaped to conform to the cross section of the inner ends of the spoke sections to be connected thereto; with spoke sections having their inner ends shaped to conform to the outer ends of the spoke bases and united thereto by electric butt welds, substantially as described.

In testimony that I claim the foregoing as my own, I affix my signature.

DAVID E. ROSS.